United States Patent
Ku et al.

(10) Patent No.: US 6,301,233 B1
(45) Date of Patent: Oct. 9, 2001

(54) EFFICIENT FLEXIBLE CHANNEL ALLOCATION IN A WIRELESS TELECOMMUNICATIONS SYSTEM

(75) Inventors: Jeng-Yann Wellington Ku, Westmont; Shujen Chen, Naperville, both of IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/164,496

(22) Filed: Oct. 1, 1998

(51) Int. Cl.[7] .................................................. H04B 7/212
(52) U.S. Cl. .............................. 370/329; 370/322; 370/1; 455/450
(58) Field of Search ...................................... 370/329, 332, 370/338, 341, 322, 342; 455/451, 452, 450, 464, 509, 516

(56) References Cited

U.S. PATENT DOCUMENTS 6,119,011 * 9/2000 Borst et al. ........................... 455/452

* cited by examiner

Primary Examiner—Wellington Chin
Assistant Examiner—Brenda H. Pham
(74) Attorney, Agent, or Firm—Walter W. Duft

(57) ABSTRACT

A method is disclosed for dynamically allocating radio frequency channels in a wireless telecommunications system populated by a plurality of contiguous cells, each of which communicates with mobile units over the allocated radio frequency channels. In accordance with the method, an optimum channel is selected for use by a requesting cell from a cost table containing values representing the cost of the requesting cell using one or more candidate channels. The selected channel is allocated to the requesting cell and the cost table is updated to reflect the new channel allocation.

21 Claims, 10 Drawing Sheets

EFFICIENT FLEXIBLE CHANNEL ALLOCATION IN A WIRELESS TELECOMMUNICATIONS SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to the allocation of radio frequency channel resources in a partitioned wireless telecommunications system. More particularly, the invention concerns a method for use in a cellular telephone system, personal communications service (PCS) network, or equivalent enterprise for efficiently performing flexible channel allocation to support call origination, termination and handoff.

2. Description of the Prior Art

Modern wireless telecommunications systems employ the concept of a partitioned service area formed by a network of contiguous geographic subdivisions, known as cells. Each cell is served by a base station that communicates with mobile units within the cell via assigned radio frequencies. The base station provides a link between the mobile units and a land-based communications network, such as a public switched telephone network, to which the base station is connected via a Digital Cellular Switch (DCS). Each base station handles call origination and termination requests from mobile units within a cell, and performs the important function of negotiating call handoffs with other base stations on behalf of mobile units transitioning between cells. A computerized Mobile Switching Center (MSC) assists the base stations to perform these functions.

One of the implications of a partitioned wireless telecommunications system is that radio frequency channels may be reused, but this is only true for cells that are relatively remote from each other. Base stations that are three cells apart or less are considered to be potentially mutually interfering and will not be allowed to share channels without restriction. Using the conventional hexagonal cell model, any given cell has thirty-six first, second and third tier cell neighbors that are potential interferers. Considering that each cell may be subdivided into six sectors serviced by individual directional antennas, each sector has seventy-two potentially interfering sector neighbors. For these potentially interfering cells and cell-sectors, available channels must be carefully allocated in a manner that avoids substantial inter-cell or inter-sector interference.

Although channels can be allocated between potentially interfering cells and sectors in mutually exclusive fashion, such that simultaneous channel sharing never occurs, this is inefficient because channels tend to be underutilized. It would be preferable to allocate channels using a flexible channel allocation technique that allows channel sharing under appropriate conditions, yet does not consume excessive processor resources at the computerized mobile switching center. What is required is a system for efficient flexible channel allocation that minimizes processor overhead and system latency, and provides robust service to end users at call setup and handoff time.

BRIEF SUMMARY OF THE INVENTION

An efficient flexible channel allocation method is provided for use in analog and digital wireless telecommunications systems populated by groupings of contiguous cells, each of which communicates with mobile units over the allocated radio frequency channels. In accordance with a preferred embodiment of the invention, an optimum channel is selected for use by a requesting cell from a cost table containing interference values representing the potential total cost (interference) of the requesting cell (or a sector thereof) using one or more candidate channels. The selected channel is allocated to the requesting cell or sector and the cost table is updated to reflect the new channel allocation. For ease of description, the term "cell" as used hereinafter refers to both cells and cell sectors.

The cost table in accordance with the preferred embodiment of the present invention is a cumulative cost table formed as a two dimensional array of N by M values, where N is the number of cells in the telecommunications system and M is the number of candidate channels available for selection by a cell. Each row of the cumulative cost table contains the cumulative costs to one of the cells of using each of the candidate channels, and each column of the cumulative cost table contains the cumulative costs to each of the cells relative to a single channel.

In order to identify an optimum channel candidate for a requesting cell, it is only necessary to consult a single row of the cumulative cost table, i.e., the one corresponding to the requesting cell, and select a candidate channel having the lowest interference. Processing time is saved because channel allocation is based on a simple cost table look-up operation. The more processor intensive operation of updating the cost table is only performed after channel selection has been completed. Moreover, the method uses a highly efficient strategy for cost table updates that involves simple addition operations as a substitute for complex matrix multiplication.

By way of explanation, the cumulative cost table is definable in mathematical terms as the result of a matrix multiplication of an N×N incremental cost table and an N×M busy table, where N and M are the same as defined above. Each row of the incremental cost table contains the incremental costs to one cell resulting from radio transmissions in each of the remaining cells in the telecommunications system. Each column of the incremental cost table contains the incremental costs that one cell imposes on each of the remaining cells as a result of radio transmissions in that cell. The incremental cost values are established when the telecommunications system is placed in service, and may be subsequently updated thereafter.

The busy table is a matrix containing binary values. Each row indicates the channels being used by one cell. Each column indicates the cells that are using a single channel. The busy table acts as a mask which when multiplied by the incremental cost table, produces the values in the cumulative cost table. More specifically, each cumulative cost table entry represents the matrix multiplication of a single row of the incremental cost table and a single column of the busy table. Remembering that a row of the incremental cost table is a series of costs imposed on a single cell by each of the other cells engaging in radio transmissions, and that a column of the busy table denotes which cells are transmitting on a given channel, the cumulative cost table entry represents the cost to a single cell resulting from use of a given channel by all other cells. This is simply a sum of the values in one row of the incremental cost table that are "switched on" by the busy table column values as a result of other cells using the channel.

Rather than engage in time consuming matrix multiplication, the invention adopts an innovative strategy that greatly simplifies the cumulative cost table update calculation. First, it can be shown mathematically that when any channel is allocated to a cell, only a single column of the incremental cost table needs to be added to a single column of the cumulative cost table in order to update the latter. Moreover, although the incremental cost table columns are N members long, many of the cost values therein will be sufficiently insignificant that they can be ignored. Thus, a compressed incremental cost table may be formed. Further processing efficiency is obtained by appending address pointers to each entry in the compressed incremental cost table that index to the corresponding row locations in the cumulative cost table where the incremental cost values are to be added.

To further speed up processing, the compressed incremental cost table is rotated such that each column in the compressed incremental cost table, which would typically be stored in nonsequential memory locations, is rotated and stored as a row in sequential memory locations. These memory locations can be accessed with minimal processor clock cycles and the incremental cost values therein can be quickly added to the cumulative cost table using the appended address pointers.

BRIEF DESCRIPTION OF THE SEVERAL VIEWS OF THE DRAWING

The foregoing and other features and advantages of the invention will be apparent from the following more particular description of a preferred embodiment of the invention, as illustrated in the accompanying Drawing, in which.

DETAILED DESCRIPTION OF THE INVENTION

Figure 1:
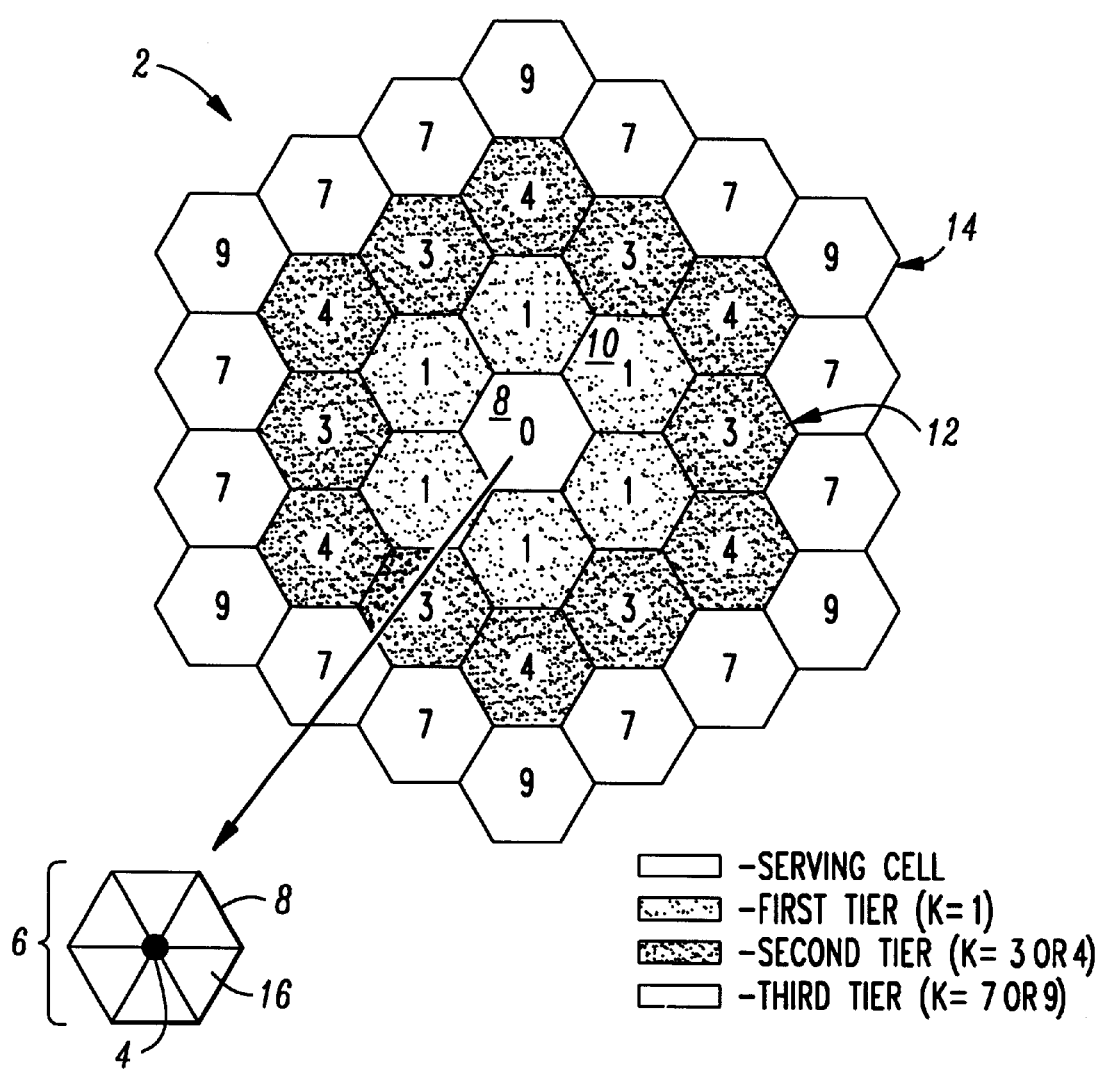
FIG. 1 is a diagrammatic plan view showing a conventional hexagonal cell pattern for a wireless telecommunications system.

Turning now to the Drawing, wherein like reference numbers designate like elements in all of the several views,
FIG. 1 illustrates a conventional pattern of hexagonal cell representations 2 forming a contiguous array of cells in a wireless telecommunications system. The wireless telecommunications system could be a cellular telephone system, a personal communications service network or any other wireless communications enterprise.

As shown in the inset to FIG. 1, each cell 2 is formed by a base station transceiver (BS) 4 and a geographic area 6 that is served by the base station to process telecommunications requests from mobile units within the cell. Of principal interest is the central cell 8, which shall be assumed to require a radio frequency channel for use by a new mobile unit entering the cell. The central cell 8 is surrounded by six first tier neighbors 10, twelve second tier neighbors 12 and eighteen third tier neighbors 14.

The letter "K" is used in FIG. 1 to denote a distance factor representing the distance between the central cell 8 and its first, second and third tier neighbor cells. All of the first tier neighbors 10 are equidistant from the central cell 8 and share a distance factor of K=1. In the second tier of neighbors 12, some cells have a distance factor of K=3 and others have a distance factor of K=4, indicating that the centers of these second tier neighbors 12 are further from the central cell 8 than the centers of the second tier neighbors 12 having a distance factor of K=3. Likewise, the third tier of neighbor cells 14 includes more proximate cells having a distance factor of K=7 and more distal cells having a distance factor of K=9.

There are thirty-six first, second and third tier neighbors altogether. These cells are considered to be potential interferers with the central cell 8, and may or may not be allowed to share frequency channels therewith depending on the conditions in effect when the central cell 8 requires a new frequency assignment. Cells having a distance factor greater than 9 are always allowed to share frequencies with the central cell 8.

The foregoing discussion assumes that each cell 2 uses a single omni-directional physical antenna face (PAF) that serves the entire cell. In practice, each cell 2 may be subdivided into as many as six sectors, each of which is served by its own PAF. This is shown in the inset to FIG. 1 in which the cell 8 is divided into six sectors 16. If the neighbors of the cell 8 are similarly subdivided, then each sector 16 may have 72 potentially interfering neighbors.

The FCC has allocated a frequency band spanning 50 MHz for use in cellular telephone communications. Another frequency band (spanning 120 MHz)has been allocated for PCS applications. For a typical cellular channel bandwidth of 30 KHz, there are a total of 416 cellular channels within the allocated 50 MHz frequency band. Out of these 416 cellular channels, approximately 395 channels are available for voice/data communications. The remaining 21 channels are reserved as control channels.

In the environment of FIG. 1, the channel allocation problem becomes a question of how to select a channel from among 395 available channels that may also be in use by thirty-six cell neighbors or up to seventy-two sector neighbors. The present invention provides an efficient method for assigning a channel in this environment. The assigned channel has the lowest cost from an interference standpoint taking into consideration all of the available channels and all of the potentially interfering neighbors of the channel-requesting cell.

Figure 2:
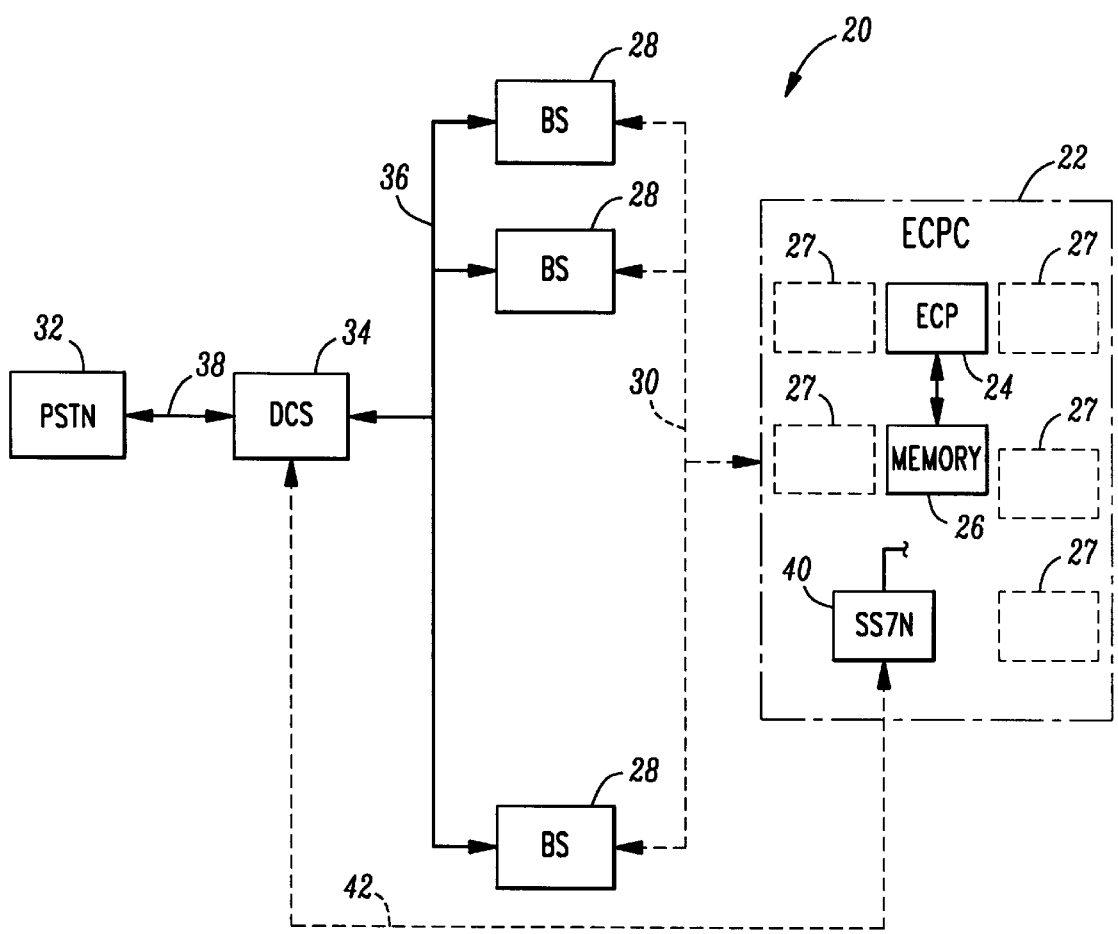
FIG. 2 is a block diagram showing a wireless telecommunications system that performs flexible channel allocation in accordance with the present invention.

Turning now to FIG. 2, a wireless telecommunications system 20 that implements the method of the present invention is shown. The wireless system 20 could be any commercial cell-based system, including the Series II, Series IIm, Series IImm, Series IIe, PCS TDMA Minicell, PCS TDMA Compact Minicell, and FLEXANT® TDMA Microcell Platform products from Lucent Technologies, Inc., operating at cellular or PCS frequencies.

The wireless system 20 is controlled by an executive cellular processing complex (ECPC) 22 that includes, among other things, an executive cellular processor 24 having a memory 26. The memory 26 stores a software program that controls the ECP 24 to perform the functions of the method described herein. Other digital processing resources 27 in the ECPC 22 could also be used in accordance with the present invention. However, in current commercial configurations, the ECP 24 is considered the best candidate for executing the inventive functions described herein, so long as the ECP's Voice Channel Administration (VCA) functions are not adversely affected. As will be seen, because channel allocation in accordance with the invention completes very quickly, call setup time is not significantly impacted.

Still referring to FIG. 2, wherein dashed lines connecting elements represent control and the solid lines represent data, the wireless system 20 includes a plurality of base stations 28 communicating with the ECPC 22 via control lines 30. Each base station 28 may have up to six PAFs servicing six cell sectors. In a typical wireless system, there could be as many as 222 base stations 28 controlled by a single ECPC 22.

The wireless system 20 communicates voice/data information with a land-based telecommunications system such as a public switched telephone network (PSTN) 32. As is conventional, these voice/data communications are routed between the base stations 28 and the PSTN 32 through a digital cellular switch (DCS) 24, such as the 5ESS-2000 Digital Cellular Switch from Lucent Technologies, Inc., connected through voice/data lines 36 and 38. As is also conventional, the ECPC 22 includes a Signaling System 7 Node (SS7N) 40 that connects to the DCS 34 via by way of a control line 42. Collectively, the ECPC 22 and the DCS 34 may be referred to as a Mobile Switching Center or MSC.

In accordance with the present invention, the wireless system 20 is programmed to dynamically allocate channels for use by any requesting cell (including any sector therein) within the system. To do this, three data structures are created and stored in the memory 26 when the wireless system 20 placed in service. These data structures are illustrated mathematically in FIG. 3 as two dimensional matrices. The first data structure is a cumulative cost table that is labeled in FIG. 3 as a Cost Of Reusing Channel (CORC) Table 50. The second data structure is an incremental cost table that is labeled in FIG. 3 as a Cost Table 60. The third data structure is a matrix that is labeled in FIG. 3 as a Busy Table 70.

The method of the present invention uses a Continuous-Update approach to channel allocation as opposed, for example, to an On-Demand method wherein an optimum channel is calculated in conjunction with a channel allocation request. In On-Demand processing, more calculations are required as more candidate channels are tested, which slows down call processing and increases call setup latency. Yet it is during busy hours at "hot spot" cells were candidate channels are most likely to fail. The added calculations bring the ECP 24 closer to overload conditions. In the worst case, all the candidates fail and the call is dropped.

These problems are avoided by the method of the present invention because channel availability data representing the cost of the requesting cell using one or more candidate channels is maintained in the CORC Table 50. To evaluate a channel, a simple table lookup is required. The CORC Table 50 is only updated after VCA channel selection processing has been completed and a channel has been allocated or de-allocated. Because CORC Table updates can be done in parallel with call processing after a channel has been selected, the calculation time does not add significantly to call setup latency.

The CORC Table 50 used in accordance with a preferred embodiment of the invention is a dynamic data structure formed as a two dimensional array of N by M values, where N is the number of cells in the wireless system 20 (e.g., 222 cells) and M is all of the voice/data channels available for use by the wireless system 20 (e.g., 395). The rows of the CORC Table 50 are indexed by the cell or sector PAFs of the wireless system 20 and the columns of the CORC Table 50 are indexed by the available channels. Each entry of the CORC Table 50 is a cumulative cost to a particular PAF of using a particular channel. Thus defined, each row of the CORC Table 50 contains the cumulative costs to one PAF of using each channel in the wireless system 20. Each column of the CORC Table 50 contains the cumulative costs to each of the PAFs relative to a single channel.

The cost entries contained in the CORC Table 50 are derived from the Cost Table 60, as explained in more detail below. These costs vary from high to low depending on whether a channel is being used by a cell's first tier, second tier or third tier neighbors. For example, the ratio of tier one to tier three cost could be about 60:1. If the cost values are normalized between 600 and 10, the sum of all costs relative to a requesting cell due to channel usage in the cell's six tier one neighbors, twelve tier two neighbors, and eighteen tier three neighbors is (600×6)+(80×12)+(10×18), which is less than 4800. Thus, a 16 bit (2 byte) memory location is sufficient for each element of the CORC Table 50. For a 222×395 CORC Table, the amount of required memory space is 175,380 bytes.

The CORC table 50 is definable mathematically as the result of a matrix multiplication of the Cost Table 60 and the Busy Table 70. The Cost Table 60 is a quasi-static data structure formed as a two dimensional array of N×N values, where N is same as defined above relative to the CORC Table 50. The Busy Table 70 is a dynamic data structure formed as a two dimensional array of N by M values, where N and M are the same as defined above relative to the CORC Table 50.

The rows of the Cost Table 60 are indexed by the cell or sector PAFs of the wireless system 20 that are affected by other PAFs. They are labeled in FIG. 3 as "Affected PAF"s. The columns of the Cost Table 60 are indexed by the cell or sector PAFs of the wireless system 20 that affect other PAFs. They are labeled in FIG. 3 as "Offending PAF"s. Each entry in the Cost Table 60 contains an incremental cost imposed by one Offending PAF on one Affected PAF as a result of radio transmissions in the Offending PAF. As indicated in the example above, these incremental costs could be normalized to values ranging from 600 (for first tier neighbors) to 80 (for second tier neighbors) to 10 (for third tier neighbors).

It will be seen that each row of the Cost Table 60 contains the incremental costs to one Affected PAF resulting from radio communications by each of the Offending PAFs representing the remaining cells in the wireless system 10. Each column of the Cost Table 60 contains the incremental costs that one Offending PAF imposes as a result of radio communications by that PAF on each of the Affected PAFs representing the remaining cells in the wireless system 10. The incremental cost values are initially selected when the wireless system 20 is placed in service. They may be subsequently updated if operations monitoring reveals a need for change.

The Busy Table 70 is a matrix containing only binary values. The rows of the Busy Table 70 are indexed by the same Offending PAFs that index the columns of the Cost Table 60. The columns of the Busy Table 70 are indexed by each of the channels that are available for use by the wireless system 20. Each entry in the Busy Table 70 is a location containing a binary value. If the value is one (1) or greater, an Offending PAF is using a particular channel. If the value is zero, the Offending PAF is not using that channel. Each row of the Busy Table 70 thus indicates the channels being used by one Offending PAF. Each column of the Busy Table 70 indicates the Offending PAFs that are using a single channel.

Figure 3:
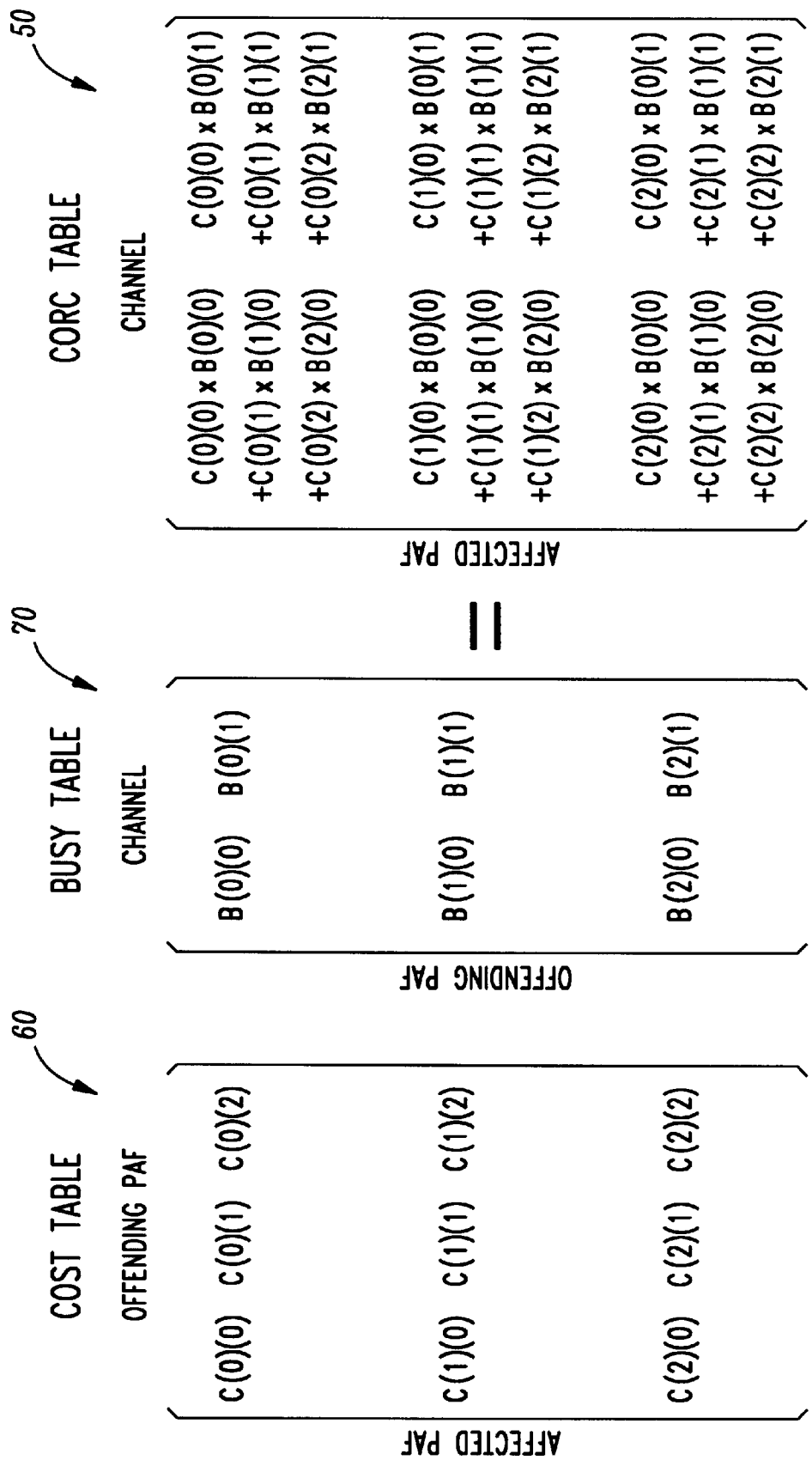
FIG. 3 is a mathematical representation of three data structures maintained in the system of FIG. 2.

The Busy Table 70 acts as a mask which when multiplied by the Cost Table, produces a summation of cost values in each entry of the CORC table 50. More specifically, each CORC Table entry represents the matrix multiplication of a single row of the Cost Table 60 and a single column of the Busy Table 70. These matrix operations are illustrated in FIG. 3. Remembering that a row of the Cost Table 60 is a series of incremental costs imposed on an Affected PAF by each of the Offending PAFs engaging in radio communications, and that a column of the Busy Table 70 denotes which Offending PAFs are transmitting on a given channel, each CORC Table entry represents a summation of the costs to a single Affected PAF from all the Offending PAFs that are using a given channel. This is simply a sum of the incremental cost values in the Affected PAF's row of the Cost Table that are "switched on" by the Busy Table column values as a result of PAFs using the channel.

To perform a channel lookup operation for a requesting PAF, the ECP 24 only needs to consult one row of the CORC Table 50 corresponding to the requesting PAF. At this stage, the requesting PAF is considered to be an Affected PAF, as indicated by the row label for the CORC Table 50 in FIG. 3. The ECP 24 may consult each of the cumulative cost entries in the requesting PAF's row. Alternatively, the ECPC 24 may be preinstructed by the PAF's base station 28 as to which channels to consider as candidate channels.

Each base station 28 may prescreen candidate channels in a procedure known as Interference Based Dynamic Channel Allocation (IBDCA). Under IBDCA, a base station 28 performs interference measurements and maintains long and short lists of idle channels that are ranked in order of low interference to high interference. To perform these functions, the base stations 28 are equipped with digital processors that implements algorithms for evaluating the long term and short term interference effects. The long term effects stem from such factors as terrain features, system deployment, and system growth. These effects may be periodically evaluated by uplink signal measurements and stored in a long list ordered by long term interference averages.

A short list is created from the top channel candidates in the long list. Short term effects include factors such as traffic patterns, radio link activity, local interference and shadow fading. The short term effects may be determined by uplink and downlink measurements and stored in a short list ordered by the short term interferences. When a call arrives at a base station 28, the channels ordered by the short term process are selected as potential candidates to serve the call.

Although the base station 28 could simply use the most preferred channel found in the short list, there are times when IBDCA channel allocation allocates channels that are subject to high interference. This occurs most often when a mobile user in a neighboring cell is hidden by an obstruction, such that the interference measurements taken by the base station 28 fail to detect the hidden user. In that case, the allocation method of the present invention, which uses the CORC table 50 to quickly assess the cost of each candidate channel determined from the base station's short list, ensures that the channel used by a hidden user who was undetected by IBDCA will not be allocated to the requesting cell. The present method may be referred to as Interference Cost Function Based Dynamic Channel Allocation (ICFBDCA).

Figure 4:
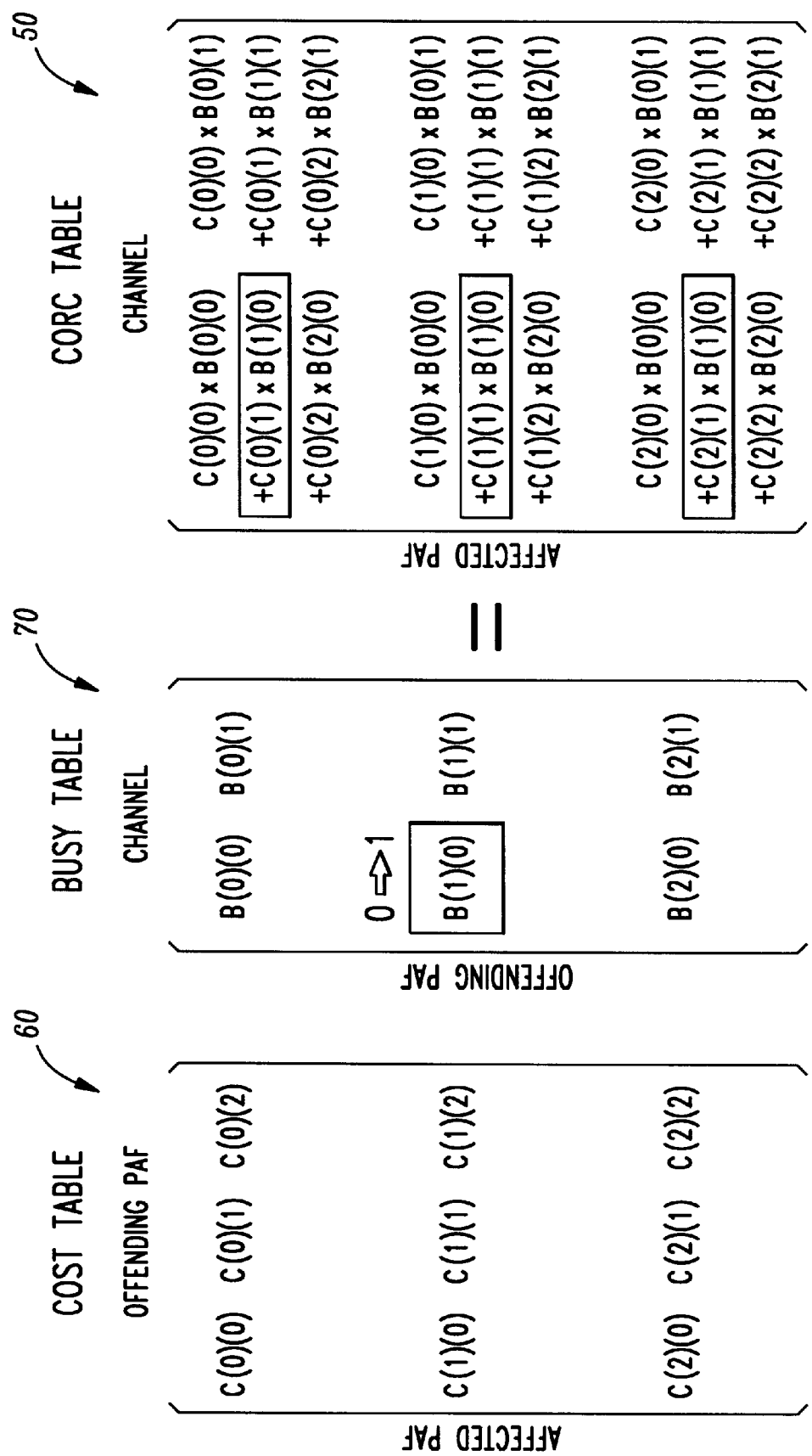
FIG. 4 is a mathematical representation of the data structures of FIG. 3 showing changes being made to the data structures following the allocation of a channel by the system of FIG. 2.

Turning now to FIG. 4, the steps which follow the allocation or de-allocation of a channel, whereby the CORC Table 50 is updated to reflect the new channel assignment, will be described. FIG. 4 shows a simplified situation which assumes there are three PAFs and two channels. It is further assumed that the second PAF was assigned the first channel and that call setup processing has been completed. The first step in the update process is to update the Busy Table 70 to reflect the new channel allocation. In FIG. 4, the binary value in the first column of the second row of the Busy Table 70 is set to reflect the fact that the second PAF has been assigned the first channel.

Mathematically, the CORC Table 50 is updated to reflect the new channel assignment by multiplying the Cost Table 60 and the Busy Table 70. Applying the principles of matrix multiplication, each row of the Cost Table 60 is multiplied by each column of the Busy Table 70. This results in an update to a single column of the CORC Table 50, i.e., the one corresponding the allocated channel.

If the CORC table 50 was updated using conventional matrix operations, each updated CORC table entry in FIG. 4 would require three multiplication operations and two addition operations to add the multiplication results. This would excessively tax the processing resources of the ECPC 24. Rather than engaging in such time consuming operations, an innovative strategy is used for greatly simplifying the cumulative cost table update calculation.

First, it can be shown mathematically that when any channel is allocated to a cell, only a single column of the Cost Table 60 needs to be added to a single column of the CORC Table 50 in order to update the latter. This can be seen from FIG. 4, which illustrates that the only change made to the first column of the CORC Table 50 is the addition of the incremental cost values found in the second column of the Cost Table 60. This reflects the fact that the second PAF that was assigned the channel, and has become an offending PAF relative to the other PAFs. The row location where the binary value was set in the Busy Table 70 corresponds to the column in the Cost Table 60 containing the incremental costs that are added to the CORC Table 50.

Figure 5:
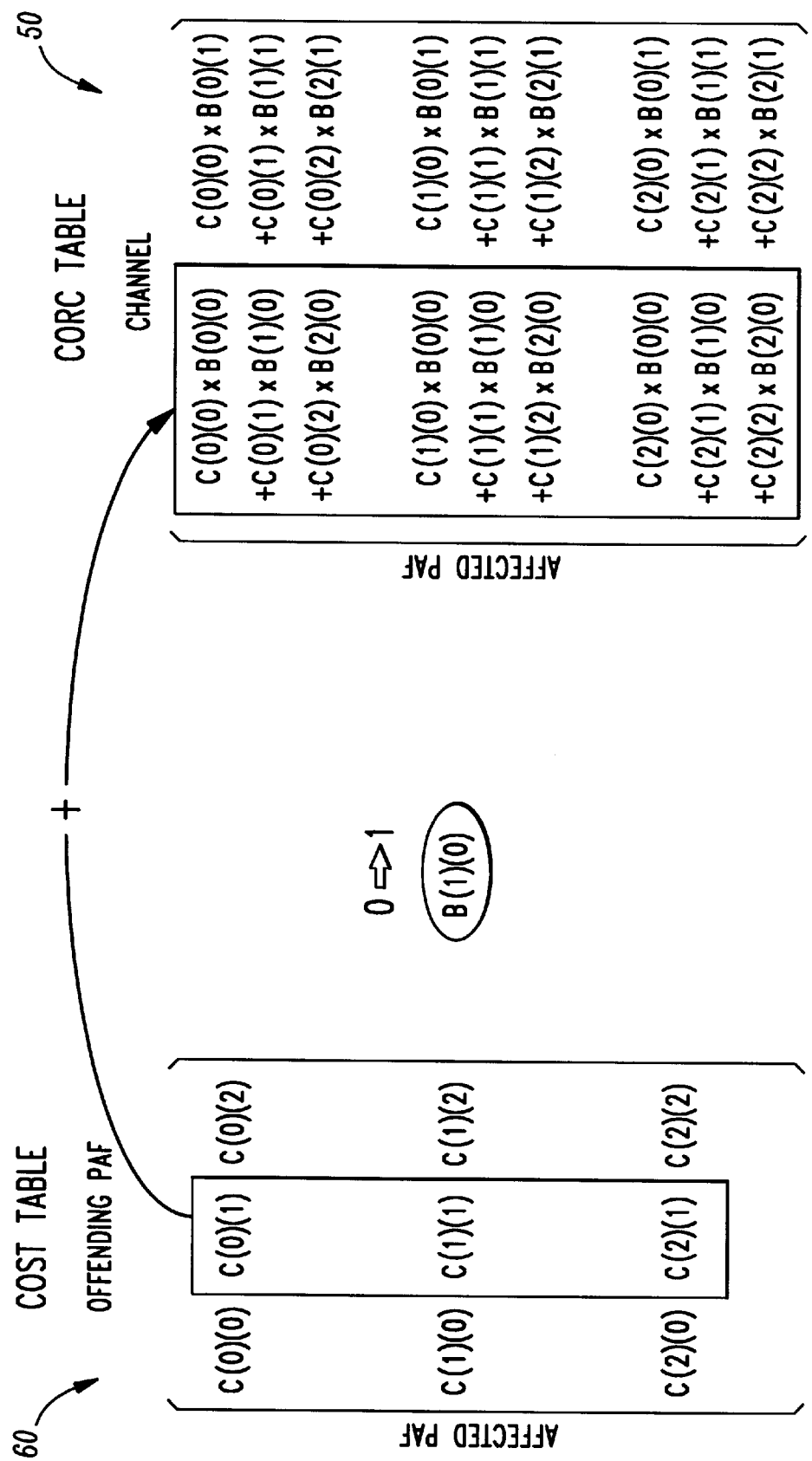
FIG. 5 is a mathematical representation of the data structures of FIG. 3 showing a simplified method for updating the data structures.

FIG. 5 graphically illustrates the simplification of the CORC Table update problem to a simple column addition operation. FIG. 5 shows that the column addition operation involves separate additions relative to corresponding Affected PAF rows of the CORC Table 50 and the Cost Table 60.

Figure 6:
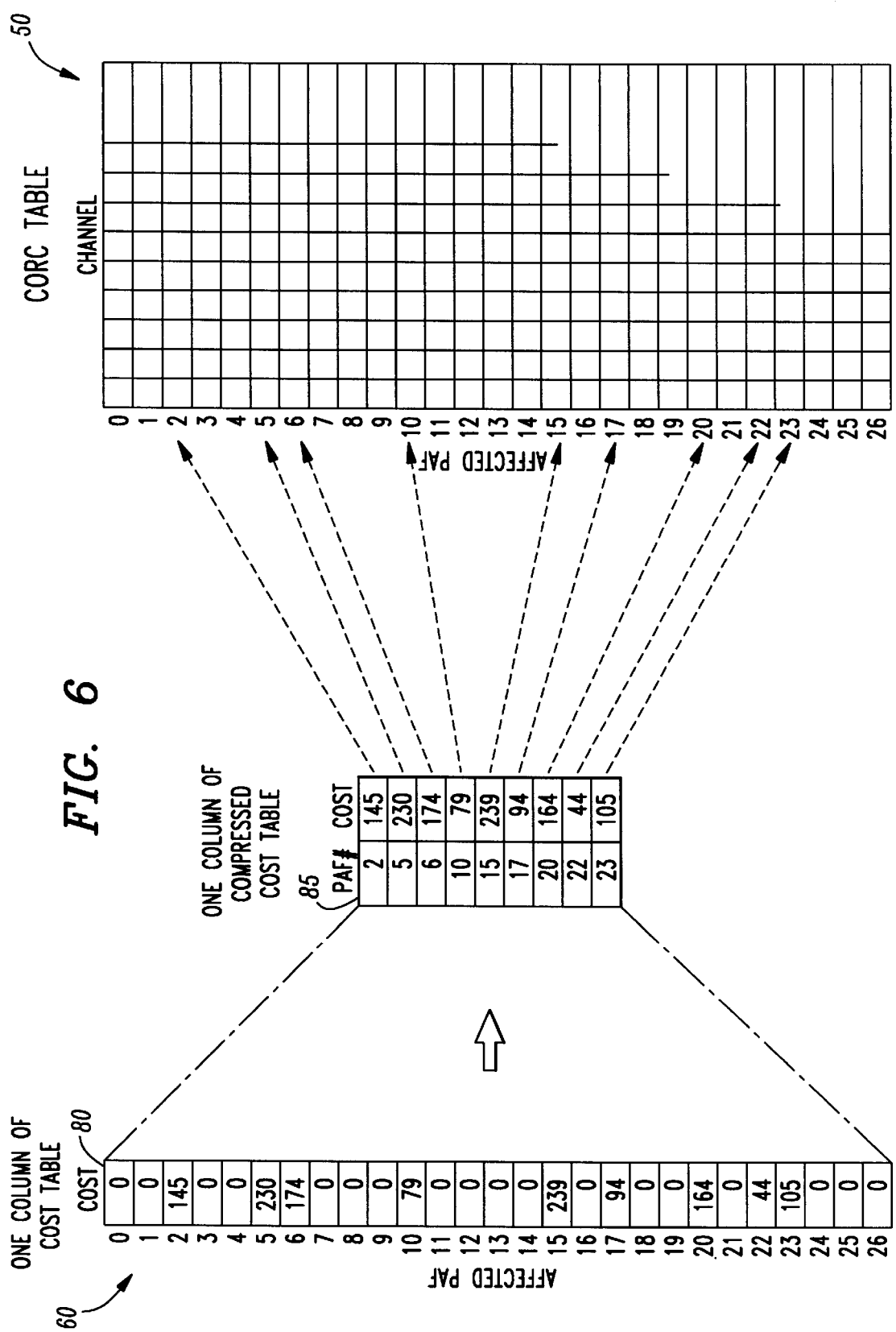
FIG. 6 is a diagrammatic representation of two of the data structures of FIG. 3 showing the storage thereof in addressable memory locations, and showing the compression of one of the tables.

Turning now to FIG. 6, and recalling that the ratio of first tier cost to third tier cost is about 60:1, further time savings may be achieved if insignificant cost values are ignored, such that the Cost Table 60 is compressed to form a Compressed Cost Table. FIG. 6 illustrates the Cost Table 60 and the CORC Table 50 in terms of their physical storage at individual addressable memory locations in the memory 26. The CORC Table 50 is shown as a two-dimensional array of memory locations wherein the elements of each row are in sequential memory locations and the elements of each column are in nonsequential memory locations. The start of each row is identified by the PAF labels 0 through 26.

A single uncompressed incremental cost column 80 of the Cost Table 60 is shown as a one-dimensional array of nonsequential memory locations identified as PAF 0 through PAF 26. When the column 80 is compressed, the PAF identifiers are prepended as PAF ID bytes to each original byte containing an incremental cost value. The result is a Compressed Cost Table Column 85 representing a two-dimensional array of nonsequential memory pair locations containing the nonsequential PAF labels 2, 5, 6, 10, 15, 17, 20, 22 and 23, along with the associated incremental cost values.

Because the Compressed Cost Table Column 85 has fewer elements than any of the CORC Table columns, an addressing scheme is required to ensure that the cost values in the Compressed Cost Table Column 85 are added to the correct locations in the CORC Table 50. Ordinarily, in order to locate one entry in a two-dimensional array, the address calculation—(A=sizeof(row) * row number+sizeof(entry) * column number)—is used. This requires two multiplication operations and one addition operation. In order to add values to just one column of a two dimensional array, the first column address in the first row of the array may be calculated by adding the offset (size of (entry) * column number) to the address denoting the beginning of the array. Sequential indexing in the same column requires an addition of the size of (row) to the previous address. Column modification addressing thus requires one multiply operation followed by sequential addition operations.

Figure 7:
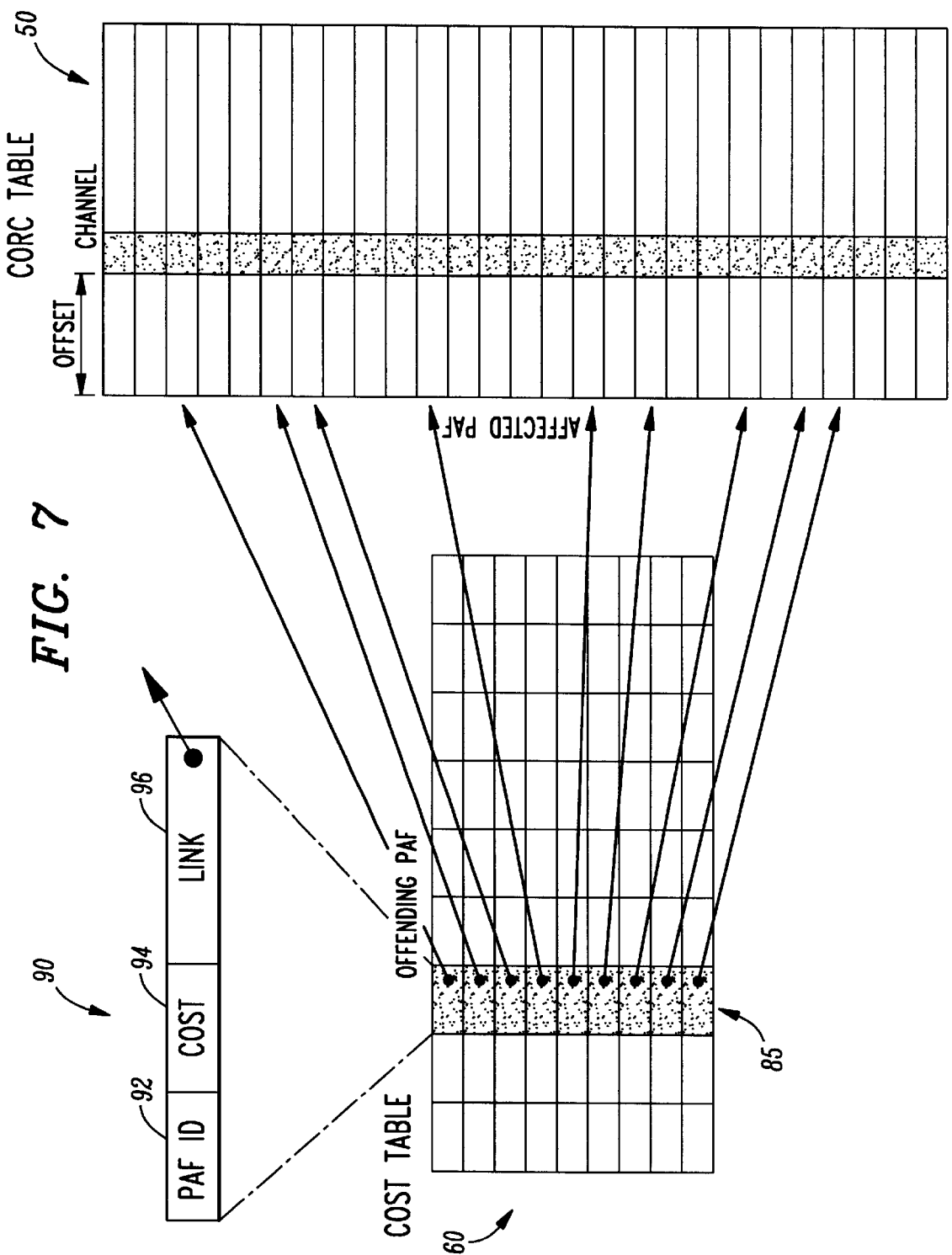
FIG. 7 is a diagrammatic representation of the two data structures shown in FIG. 6 illustrating the storage of addressing information in one of the data structures.

For CORC Table updates in accordance with the present invention, the foregoing addressing operations are avoided. When each row of the Cost Table 60 is generated, a link containing the address of the corresponding row of the CORC Table 50 is stored with each cost entry. This is shown in FIG. 7, which illustrates a single Cost Table entry 90 having a PAF ID byte 92, a Cost byte 94 and a Link byte 96. The column offset to the CORC table 50 is calculated from the allocated channel number and stored for use during each of the column addition operations.

Figure 8:
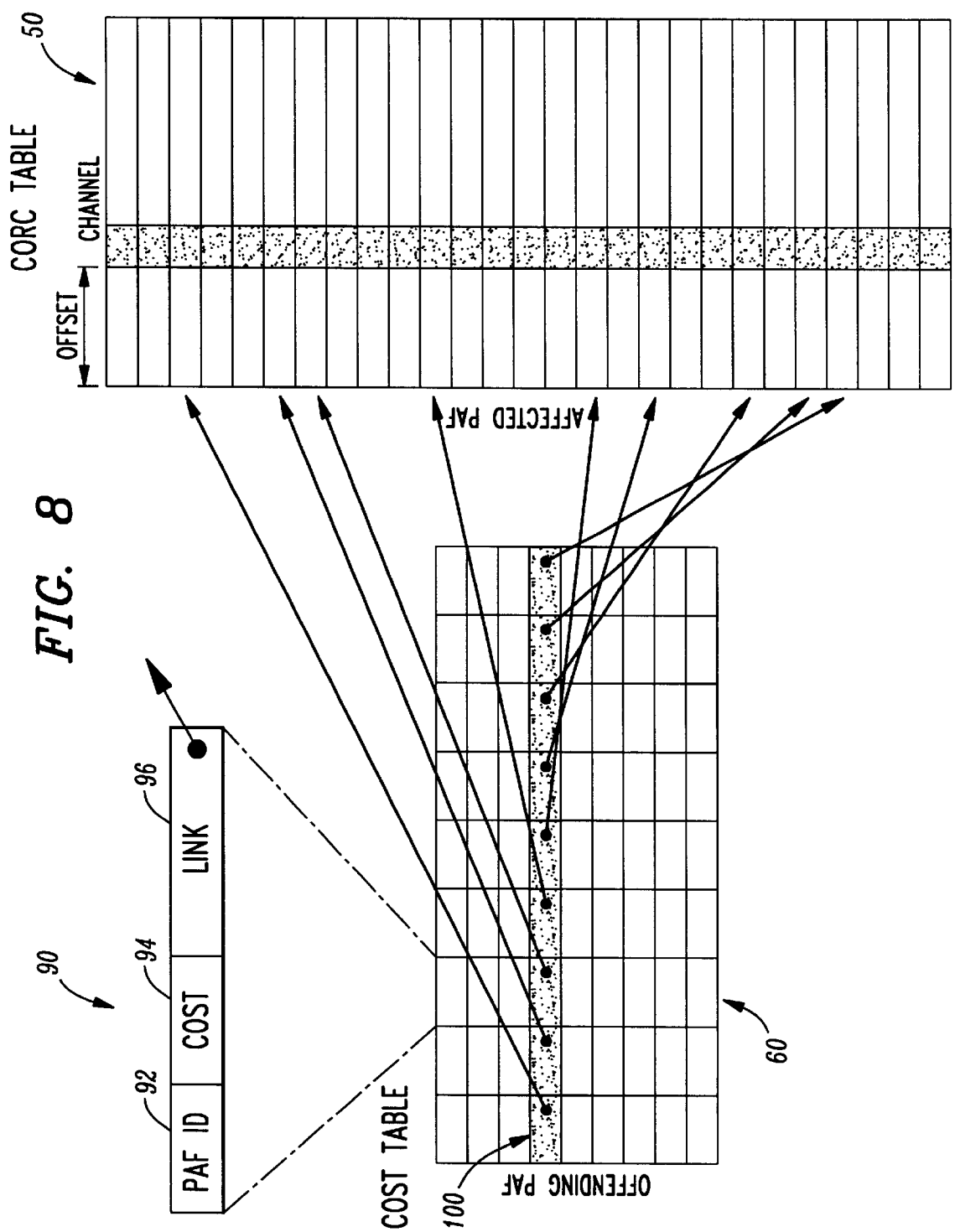
FIG. 8 is a diagrammatic representation of the two data structures of FIG. 7 showing the rotation of one of the data structures to speed processing.

To further speed up processing, the Cost Table 60, which has been also been compressed as described above, may be rotated as shown in FIG. 8. The Compressed Cost Table Column 85, whose byte pairs were previously stored in nonsequential memory locations, are now rotated and stored as a row 100 in sequential memory locations. These memory locations can be accessed with minimal processor clock cycles and the compressed incremental cost values therein may added to the corresponding CORC Table locations at the CORC Table row addresses pointed to by the aforementioned pointers.

Figure 9:
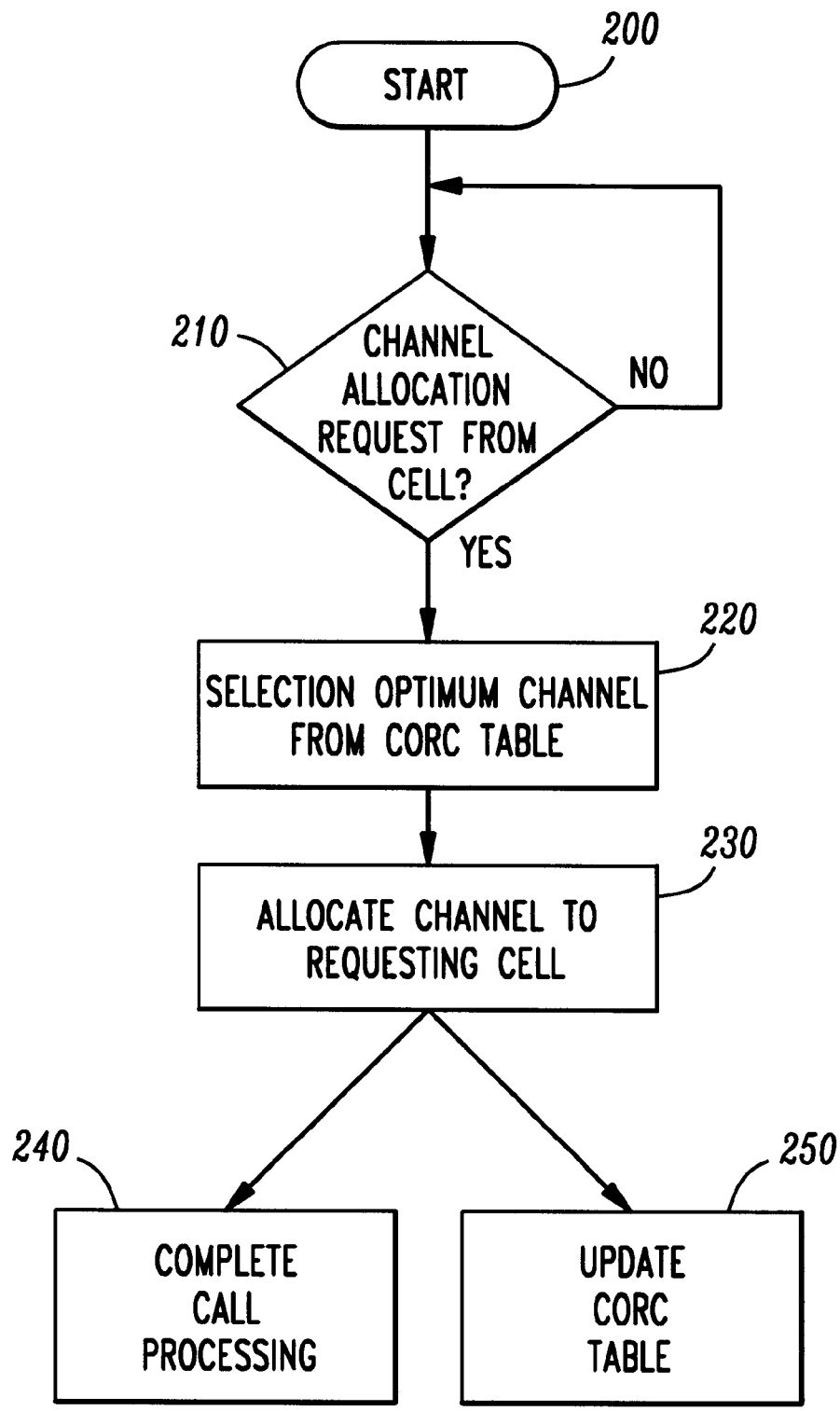
FIG. 9 is a flow diagram illustrating method steps performed by the system of FIG. 2 to allocate a channel to a requesting cell in accordance with the present invention.
Figure 10:
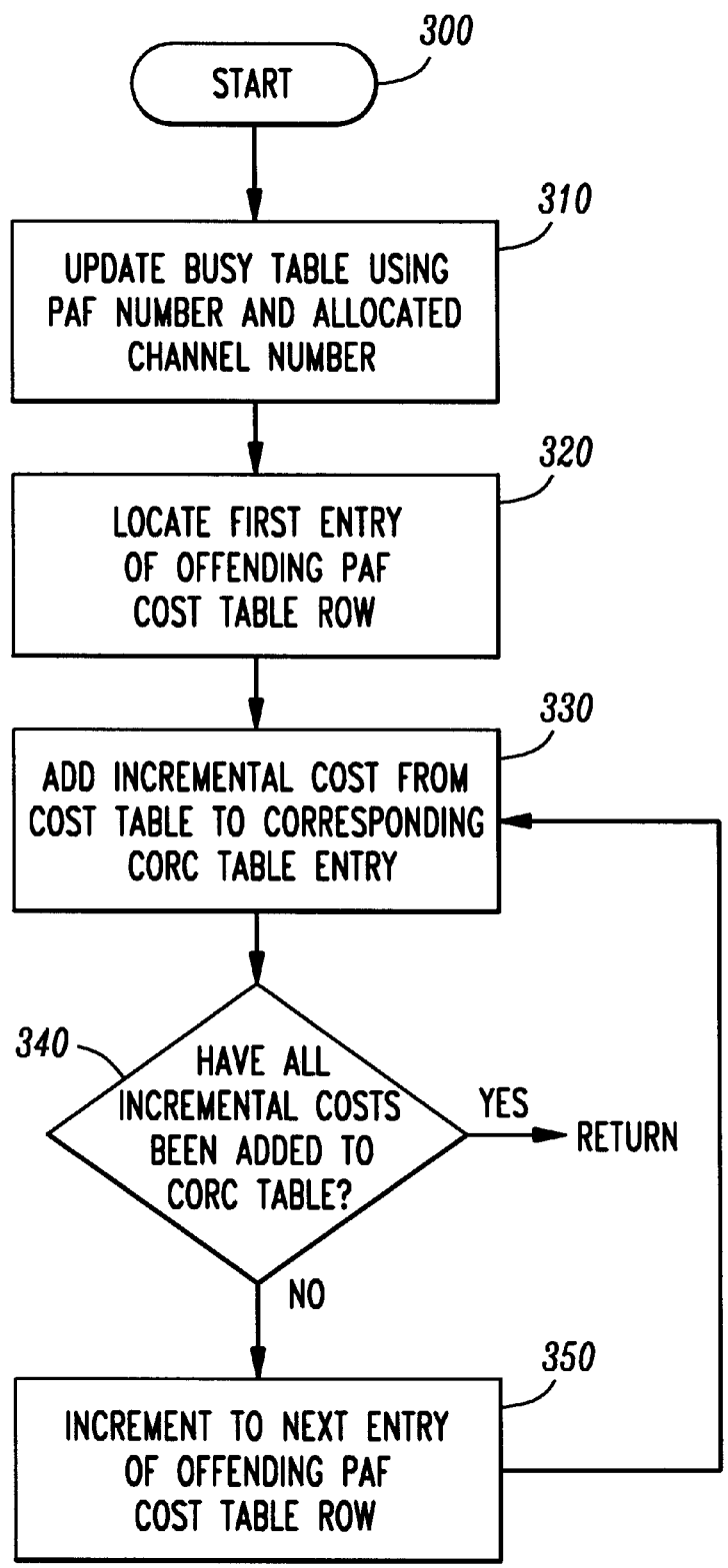
FIG. 10 is a flow diagram illustrating method steps performed by the system of FIG. 2 to update a cumulative cost table following channel allocation in accordance with the present invention.

FIGS. 9 and 10 illustrate this processing. FIG. 9 shows an overall channel allocation process in accordance with the invention. FIG. 10 illustrates a CORC table update operation, as performed by the ECP 24. In FIG. 9, the channel allocation process begins at Step 200. In Step 210, the ECP 24 loops until a channel allocation request is made. In step 220, the ECP 24 selects an optimum channel from the CORC table 50 from the candidate channels supplied by the requesting base station 28. This channel is allocated to the requester and the ECPC 22 continues call processing in step 240 while the ECP 24 updates the CORC Table 50 in step 250 to reflect the new channel allocation.

In FIG. 10, the CORC Table update operation begins in step 300 and then optionally proceeds to step 310 in order to update the Busy Table 70. Step 310 is optional because it is not essential to maintain a Busy Table 70. The process of updating the CORC Table 50 requires only that the number of the allocated channel be known so that the appropriate row of the rotated Cost Table 60 can be identified for adding to the corresponding column of the CORC Table 50. The Busy Table 70 may be useful, however, for other Operations, Administration & Maintenance (OA&M) purposes, such as system auditing. In that event, the PAF number of the requesting base station 28 and the number of the allocated channel are used to access the correct Busy Table row and column.

In step 320, the PAF number is also used to locate the row of the compressed and rotated Cost Table 60 that corresponds to the requesting PAF, which is now an Offending PAF. In step 330, the first incremental cost entry in this Offending PAF row is added to the corresponding CORC Table entry. The address of the corresponding CORC table entry is the found by adding the address link value stored with the incremental cost value in the Cost Table 60 to a channel offset derived using the number of the allocated channel in accordance with the formula Column Offset= sizeof(entry) * channel number. In step 340, the process 410 returns if all of the incremental cost values in the Offending PAF row of the Cost Table 60 have been added to the corresponding CORC Table entries. If all such values have not been added the next Cost Table entry is located in step 350 and the process loops back to step 330.

Accordingly, an efficient flexible channel allocation method has been described. While various embodiments have been disclosed, it should be apparent that many variations and alternative embodiments would be apparent to those skilled in the art in view of the teachings herein. It is understood, therefore, that the invention is not to be in any way limited except in accordance with the spirit of the appended claims and their equivalents.

What is claimed is:

1. In a wireless telecommunications system populated by a plurality of contiguous cells, each of which communicates with mobile units over allocated radio frequency channels, a method for dynamically allocating a new radio frequency channel to a cell requesting a new channel, comprising the steps of:
   selecting an optimum channel for use by said requesting cell from a cumulative cost table containing values representing the cost of said requesting cell using one or more candidate channels;
   allocating said selected channel to said requesting cell; and
   updating said cost table without use of matrix multiplication operations to reflect said channel allocation to said requesting cell.

2. The method of claim 1 wherein said cost table contains cost values representing the cost to each of said plurality of cells using each of said candidate channels, such that for N cells in said telecommunications system and M candidate channels there are N×M cost values in said cost table, with each row of said cost table representing one of said plurality of cells and each column of said cost table representing one of said candidate channels.

3. A method in accordance with claim 2 wherein said cost table updating step includes updating cost values in a column of said cost table corresponding to said selected channel.

4. The method of claim 3 wherein said cost table contains cumulative cost values, each of which represents a summation of incremental costs to one of said plurality of cells resulting from the use of a candidate channel by other ones of said plurality of cells.

5. In a wireless telecommunications system populated by a plurality of contiguous cells, each of which communicates with mobile units over allocated radio frequency channels, a method for dynamically allocating a new radio frequency channel to a cell requesting a new channel, comprising the steps of:

selecting an optimum channel for use by said requesting cell from a cost table containing values representing the cost of said requesting cell using one or more candidate channels;

allocating said selected channel to said requesting cell;

updating said cost table to reflect said channel allocation to said requesting cell;

wherein said cost table contains cost values representing the cost to each of said plurality of cells using each of said candidate channels, such that for N cells in said telecommunications system and M candidate channels there are N×M cost values in said cost table, with each row of said cost table representing one of said plurality of cells and each column of said cost table representing one of said candidate channels;

wherein said cost table updating step includes updating cost values in a column of said cost table corresponding to said selected channel;

wherein said cost table is a cumulative cost table containing cumulative cost values, each of which represents a summation of incremental costs to one of said plurality of cells resulting from the use of a candidate channel by other ones of said plurality of cells; and wherein said incremental costs are derived from an incremental cost table containing N×N incremental cost values, where N is the number of cells in said telecommunications system, each row of said incremental cost table containing the incremental costs that are placed on one of said plurality of cells by radio communications in the other ones of said plurality of cells, and each column of said incremental cost table containing the incremental cost values that one of said plurality cells engaging in radio communications places on other ones of said plurality of cells, and wherein one column of cumulative cost values in said cumulative cost table is updated by adding entries from one column of said incremental cost table thereto, the entries in said incremental cost table column representing the costs imposed by said requesting cell on other ones of said plurality of cells.

6. A method in accordance with claim 5 wherein said incremental cost table is compressed to eliminate entries having insignificant costs.

7. A method in accordance with claim 6 wherein the values in each incremental cost table column are stored with pointers to the row addresses of corresponding ones of said cumulative cost table memory locations, such that the processing time for updating said cumulative cost table is reduced.

8. A method in accordance with claim 7 wherein said compressed incremental cost table is rotated such that each column thereof becomes a row of incremental cost values and associated address pointers stored in sequential memory locations, such that the processing time for updating said cumulative cost table is further reduced.

9. A method in accordance with claim 1 wherein said candidate channels are determined by said cell, and wherein said channel selecting step, said channel allocation step and said table update step are performed by a mobile switching center that controls said telecommunications system.

10. A method in accordance with claim 5 wherein the incremental cost values of said incremental cost table are based on predetermined information that may be updated as necessary to reflect new information.

11. In a wireless telecommunications system populated by a plurality of contiguous cells, each cell communicating with mobile units over allocated radio frequency channels, a system for dynamically allocating a new radio frequency channel to a cell requesting a new channel, comprising:

selecting means for selecting an optimum channel for use by said requesting cell from a cumulative cost table containing values representing the cost of said requesting cell using one or more candidate channels;

allocating means for allocating said selected channel to said requesting cell; and updating means for updating said cost table without use of matrix multiplication operations to reflect said channel allocation to said requesting cell.

12. The system of claim 11 wherein said cost table contains cost values representing the cost to each of said plurality of cells using each of said candidate channels, such that for N cells in said telecommunications system and M candidate channels there are N×M cost values in said cost table, with each row of said cost table representing one of said plurality of cells and each column of said cost table representing one of said candidate channels.

13. A system in accordance with claim 12 wherein said cost table updating means includes means for updating cost values in a column of said cost table corresponding to said selected channel.

14. The system of claim 13 wherein said cost table contains cumulative cost values, each of which represents a summation of incremental costs to one of said plurality of cells resulting from the use of a candidate channel by other ones of said plurality of cells.

15. In a wireless telecommunications system populated by a plurality of contiguous cells, each cell communicating with mobile units over allocated radio frequency channels, a system for dynamically allocating a new radio frequency channel to a cell requesting a new channel, comprising:

selecting means for selecting an optimum channel for use by said requesting cell from a cost table containing values representing the cost of said requesting cell using one or more candidate channels;

allocating means for allocating said selected channel to said requesting cell; updating means for updating said cost table to reflect said channel allocation to said requesting cell;

wherein said cost table contains cost values representing the cost to each of said plurality of cells using each of said candidate channels, such that for N cells in said telecommunications system and M candidate channels there are N×M cost values in said cost table, with each row of said cost table representing one of said plurality of cells and each column of said cost table representing one of said candidate channels;

wherein said cost table updating means includes means for updating cost values in a column of said cost table corresponding to said selected channel;

wherein said cost table is a cumulative cost table containing cumulative cost values, each of which represents a summation of incremental costs to one of said plurality of cells resulting from the use of a candidate channel by other ones of said plurality of cells; and wherein said incremental costs are derived from an incremental cost table containing N×N incremental cost values, where N is the number of cells in said telecommunications system, each row of said incremental cost table containing the incremental costs that are placed on one of said plurality of cells by radio communications in the other ones of said plurality of cells, and each column of said incremental cost table containing the incremental cost values that one of said plurality cells engaging in radio communications places on other ones of said plurality of cells, and wherein one column of cumulative cost values in said cumulative cost table is updated by adding entries from one column of said incremental cost table thereto, the entries in said incremental cost table column representing the costs imposed by said requesting cell on other ones of said plurality of cells.

16. A system in accordance with claim 15 wherein said incremental cost table is compressed to eliminate entries having insignificant costs.

17. A system in accordance with claim 16 wherein the values in each incremental cost table column are stored with pointers to the row addresses of corresponding ones of said cumulative cost table memory locations, such that the processing time for updating said cumulative cost table is reduced.

18. A system in accordance with claim 17 wherein said compressed incremental cost table is rotated such that each column thereof becomes a row of incremental cost values and associated address pointers stored in sequential memory locations, such that the processing time for updating said cumulative cost table is further reduced.

19. A system in accordance with claim 11 wherein said candidate channels are determined by said cell, and wherein said channel selecting means, said channel allocation means and said table update means are implemented by a mobile switching center that controls said telecommunications system.

20. A system in accordance with claim 15 wherein the incremental cost values of said incremental cost table are based on predetermined information that may be updated as necessary to reflect new information.

21. In a wireless telecommunications system populated by a plurality of contiguous cells, each cell communicating with mobile units over allocated radio frequency channels, a method for dynamically allocating a new channel to a cell, comprising the steps of:

selecting an optimum channel for use by said cell from a cumulative cost table;

said cumulative cost table being a data structure definable as a two dimensional array of N by M values where N is the number of cells in said telecommunications system and M is the number of candidate channels available for selection by said cell, each row of said cumulative cost table containing the cumulative costs to one of said cells of using each of said candidate channels, and each column of said cumulative cost table containing the cumulative costs to each of said cells relative to a single channel;

said cumulative cost table being further definable as the result of a matrix multiplication of an incremental cost table and a busy table;

said incremental cost table being a data structure definable as a two dimensional array of N by N values where N is the number of cells in said telecommunications system, each row of said incremental cost table containing the incremental costs to one of said cells resulting from radio communications in that cell on each of the remaining cells in said telecommunications system, and each column of said incremental cost table containing the incremental costs that one of said cells imposes as a result of radio communications in that cell on each of the remaining cells in said telecommunications system;

said busy table being a data structure definable as a two dimensional array of N×M values where N is the number of cells in said telecommunications system and M is the number of candidate channels available for selection by said cell, each row of said busy table array containing binary values indicating the candidate channels being used by one of said cells, and each column of said busy table containing binary values indicating the cells that are using a single channel;

each cumulative cost table entry representing a matrix multiplication of a single row of said incremental cost table and a single column of said busy table, the result of which is the cumulative cost to a single cell in said telecommunications system of using a single channel based on use of said channel by the other cells in said telecommunications system;

allocating said selected channel to said cell; and updating a column of said cumulative cost table to reflect said channel allocation to said cell.

* * * * *